Apr. 10, 1923.
A. W. MARQUIS
BORING MACHINE
Filed Feb. 17, 1920
1,451,585
2 sheets-sheet 1
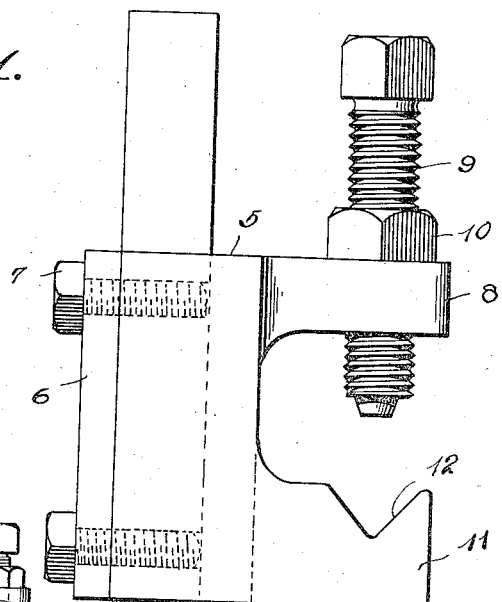
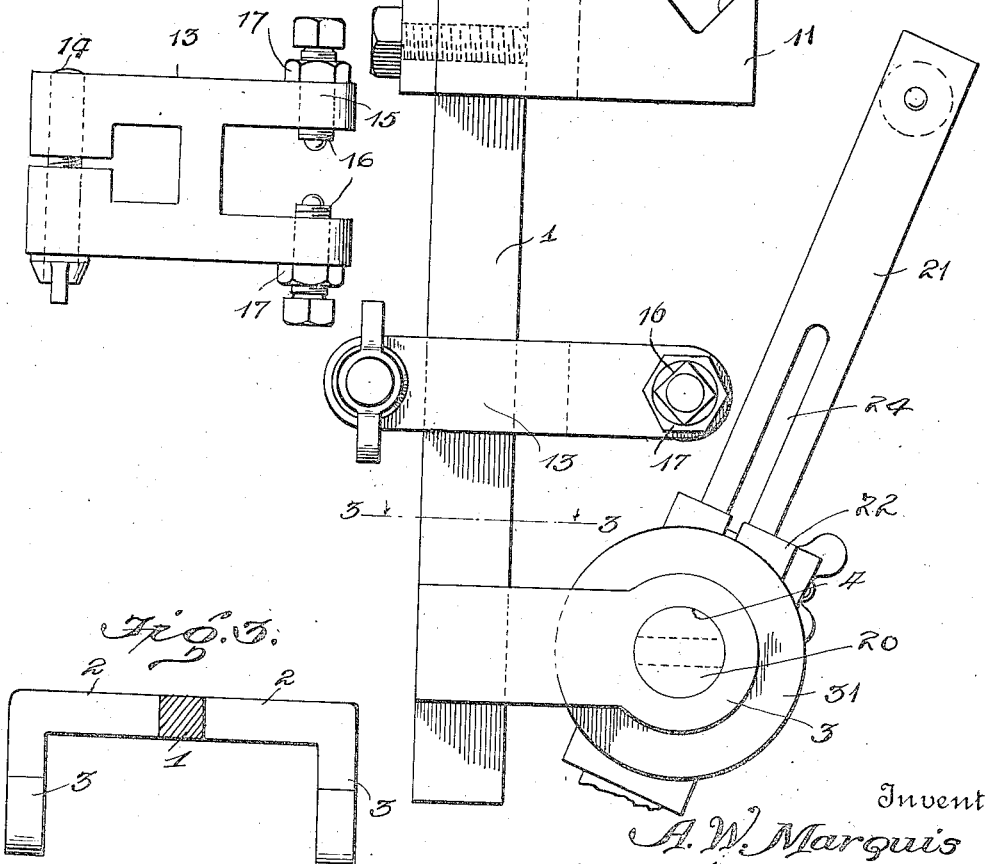
Inventor
A. W. Marquis
By
his Attorney Apr. 10, 1923.
A. W. MARQUIS
BORING MACHINE
Filed Feb. 17, 1920
1,451,585
2 sheets-sheet 2
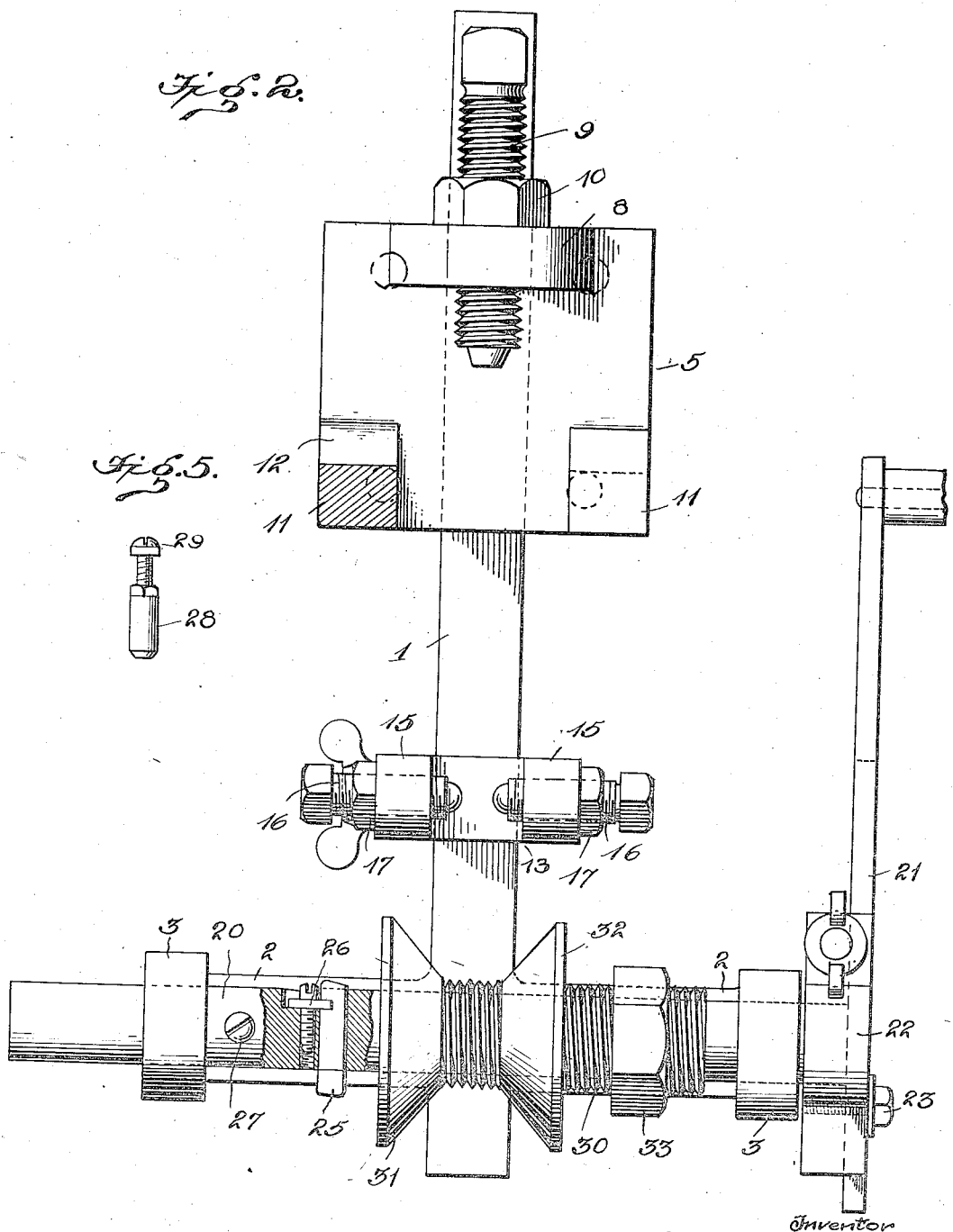

Patented Apr. 10, 1923.

1,451,585

UNITED STATES PATENT OFFICE.

ALISTER W. MARQUIS, OF HOLLISTER, CALIFORNIA.

BORING MACHINE.

Application filed February 17, 1920. Serial No. 359,385.

*To all whom it may concern:*

Be it known that I, ALISTER W. MARQUIS, a citizen of the United States, residing at Hollister, in the county of San Benito and State of California, have invented certain new and useful Improvements in Boring Machines; and I do hereby declare the following to be a full, clear, and exact description of the invention, such as will enable others skilled in the art to which it appertains to make and use the same.

In fitting Babbitt metal bushings or bearings of a connecting rod to the crank pin it has been customary to first rub pigment on the crank pin, then to clamp the bearing on the crank pin (with the bushings in place) tighten it and turn the shaft over; then to remove the connecting rod from the crank pin and scrape the babbitt bushings to remove the high parts marked by the pigment. This operation is generally repeated until a nice fit is obtained and is a laborious and exacting task.

It is an object of my invention to true the crank pin bearing of a connecting rod by boring it; and the invention comprises a connecting rod holder in combination with a boring tool and a centering device to adjust the position of the bearing and boring tool. One embodiment of the invention is described in the specification and illustrated in the accompanying drawings wherein:

Figure 1 is a side elevation of a boring tool, connecting rod clamp, and centering devices; Figure 2 is a front elevation of the complete apparatus; Figure 3 is a reduced section through the clamping frame on line 3—3 of Figure 1; Figure 4 is a view of the middle clamp detached and Figure 5 is an elevation of a gaging element, adjustable in length, adapted to slide freely in an opening transverse of the boring bar.

Similar references characters designate corresponding parts throughout the several views.

The machine comprises a frame having adjustable clamping means designed to hold a connecting rod of a small internal combustion engine one or more bearings therein for guiding a boring bar, a means for centering the crank pin bearing of the connecting rod with respect to said bearings in the frame, and a boring tool adapted to rotate in the clamp bearing.

The clamp frame comprises a bar 1 having at one end, which may be called the lower end, aligned cross bars 2, occupying the same plane as the bar 1, and bearing hangers 3 projecting at right angles to the said plane from the ends of the bars 2, the bearing hangers 3 having bearing orifices 4 accurately sized to receive a boring bar designed to enter them. Two clamping devices are adjustably mounted on the bar 1. One of these clamping devices is adapted to secure the wrist pin and wrist-pin end of the connecting rod, and the other is adapted to clamp the sides of the connecting rod between its ends.

The clamp for the wrist pin end comprises a body 5, which has a groove, rectangular in cross section, fitted to the rectangular bar 1. A cap plate 6 is secured by bolts 7 to the body 5 and may be tightened by said bolts so as to clamp the bar 1 firmly, or may be loosened so that the clamp may slide on said bar 1. The body 5 has a median lug 8, through which is threaded a set bolt 9, which may be locked by a nut 10. Opposed to the median lug 8 are two spaced lugs 11. In the sides of the lugs 11 that face lug 8 are V-shaped notches 12. The center of the set bolt 9, if extended, would pass midway between the lugs 11. In use the wrist pin is seated in the V-shaped notches and the set bolt bears upon the end of the rod.

The middle clamp is designated 13. It has a square opening fitted to the bar 1, a kerf or division extending from the center of the opening, and a clamp bolt 14 serves to bind the clamp 13 in place upon the bar 1, or permit it to loosen so that it may be adjusted on said bar. Spaced lugs 15 on said clamp 13 are adapted to embrace a connecting rod between them and set bolts 16 in each lug may be tightened to bear upon opposite sides of the connecting rod and be locked by nuts 17.

The boring bar is designated 20 and is illustrated as journalled in the bearing orifices 4. At the right hand end as illustrated is Figure 2, a hand crank 21 is secured. The crank 21 is slidable in a diametrical seat in the face of a split clamp 22 secured to the end of the boring bar and may be adjusted by the clamp screw 23 passing through the slot 24 in a usual manner. The cutting tool is shown at 25 and the adjusting screw therefor at 26; 27 is a hole adapted to receive a gage 28 having a screw 29 for adjustment. The centering devices comprise the threaded sleeve 30 which has a bore accurately fitting the boring bar 20. Secured to one end of sleeve 30 is a centering cone 31, its conical surface facing toward the other end of said sleeve. A second centering cone 32 is freely movable over the sleeve and is reversed in position as to cone 31. A nut 33 threaded on sleeve 30 is adapted to force the cones 31 and 32 toward each other. In practice the cones 31 and 32 enter the bearing of a connecting rod from opposite ends and as they are forced together they bring the bearing into a position precisely concentric with the bearing orifices 4 in bearing hangers 3, and with the boring bar 20 supported in said bearing orifices.

In use the babbit or other bushings will be fitted to the connecting rod. Boring bar 20 and centering devices are removed from position in the clamp frame. The small end of the connecting rod will be placed in the end clamp, the wrist pin resting in the V-grooves 12 and set bolt 9 in position to bear against the end of the connecting rod. The clamp 13 will be slid to mid position with bolts 16 opposite the sides of the rod, and the crank pin bearing will be brought roughly into registry with the bearings 4. Sleeve 30, carrying centering cone 31, may then be inserted through the connecting rod bearing. Cone 32 may be slid over the other end of sleeve 30 and nut 33 threaded on the sleeve. Boring bar 20 (with tool 25 removed) should then be passed through the boring orifices 4 and sleeve 30. The cones 31 and 32 should be brought toward each other to adjust the bearing orifice in the connecting rod concentric with the bearing orifices 4 and boring bar 20. Then the set bolt 9 should be tightened; also side clamp screws 16, and bolts 7 and 14 to fix the connecting rod securely in position,—lined up true and ready to be bored. Boring bar 20 may then be pulled out, centering cones loosened, nut 33 and cone 32 taken off and sleeve 30 removed. Boring bar 20 may then be reinserted through bearing orifices 4 and will be concentric with the crank pin bearing clamped in the frame. The test gage 28 may be seated, boring tool 25 adjusted by the aid of gage 28 or any suitable gage, and the bar rotated to bore out the bearing. The gage 27 may be used to test the dimension of the bore both before and after boring.

Having described my invention in the form now best known to me, what I claim and desire to secure by Letters Patent is:

1. A boring appliance comprising a T-shaped frame consisting of a longitudinal bar united to a cross bar at one end, bearing hangers offset from said cross bar and provided with aligned bearing openings, two clamps sleeved over said longitudinal bar and means for securing said clamps at different points along said bar, one of said clamps being constructed so as to receive the wrist-pin of a connecting rod and hold it parallel with the axis of said bearing openings, and the other being adapted to clamp the sides of the connecting rod between its ends, and V-shaped seats of the wrist-pin clamp opening away from the axis of the bearing openings.

2. A boring appliance comprising a frame bar, a guiding means for a boring bar offset from said frame bar, and having an axis transverse thereof, a clamp on said frame bar comprising a pair of spaced offset members having aligned grooves in one face and an opposed lug through which a clamp bolt is threaded, a clamp on said frame bar between said first named clamp and said boring bar guiding means, whereby a connecting rod may be held to the frame with its crank pin bearing in alignment with the boring bar guide.

3. In a boring machine, a frame having a guide bearing for a boring bar, a boring bar adapted to be journaled in said guide bearing, a sleeve adapted to fit over said boring bar, centering cones on said sleeve, means for forcing them toward each other and means on said frame for securing a work piece to the frame after the work piece has been centered by the centering cones.

4. In a boring machine, a frame having a guide bearing for a boring bar, a boring bar adapted to be journaled in said guide bearing, a sleeve adapted to be removably fitted over said boring bar, a centering cone secured to one end of the sleeve, a centering cone adapted to be removably mounted on said sleeve, a removable device on said sleeve for forcing said cones toward each other and means on said frame for securing a work piece to the frame after the work piece has been centered by the centering cones.

In testimony whereof I affix my signature.

ALISTER W. MARQUIS.